Figure 1:
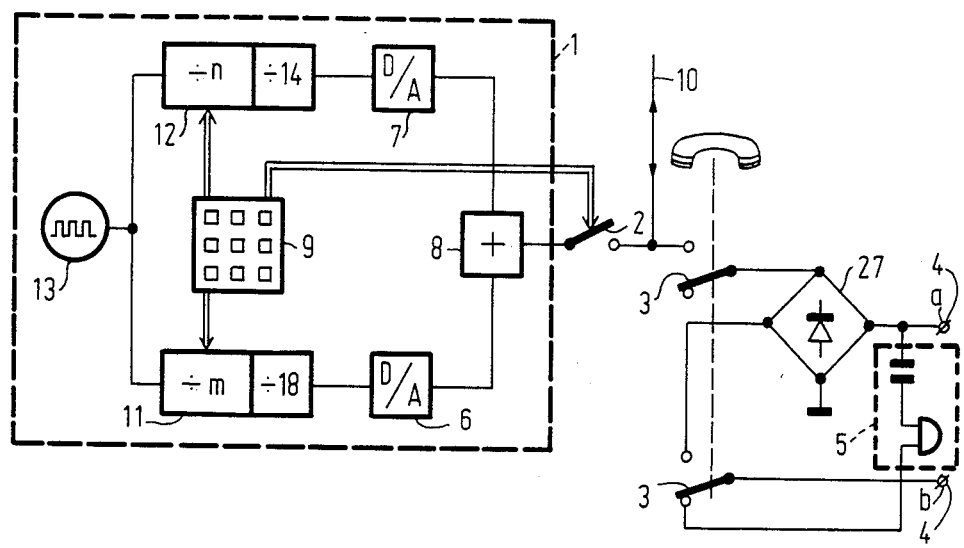

United States Patent [19]
Janssen

[11] Patent Number: 4,571,462
[45] Date of Patent: Feb. 18, 1986

[54] MULTIPLE USE DIGITAL TONE GENERATOR IN TELEPHONE

[75] Inventor: Daniël J. G. Janssen, Eindhoven, Netherlands

[73] Assignee: U.S. Philips Corporation, New York, N.Y.

[21] Appl. No.: 663,603

[22] Filed: Oct. 22, 1984

[30] Foreign Application Priority Data

Oct. 27, 1983 [NL] Netherlands .......................... 8303701

[51] Int. Cl.⁴ ............................................. H04M 1/50
[52] U.S. Cl. ................. 179/84 T; 179/84 R; 179/81 R; 179/84 VF
[58] Field of Search ............. 179/84 VF, 84 T, 84 R, 179/81 R, 84 A, 90 AD, 90 B, 90 BB, 90 BD, 90 CS

[56] References Cited

U.S. PATENT DOCUMENTS 4,070,551 1/1978 Weir ................................ 179/18 FC
4,503,288 3/1985 Kessler ............................. 179/2 DP

OTHER PUBLICATIONS

W. David Pace, "LSI for Telecommunications-A One Chip Telephone", Telecommunications, Apr. 1984.

Primary Examiner—James L. Dwyer
Attorney, Agent, or Firm—Thomas A. Briody; William J. Streeter; Leroy Eason

[57] ABSTRACT

Electronic telephone set having DTMF tone dialling. By some slight additions to the logic circuits of the digital DTMF tone generator this tone generator is made suitable for generating a two-tone ringing signal, for supervising the frequency of the incoming ringing voltage and for generating a tone interval of approximately 0.1 s for the call-back function.

7 Claims, 4 Drawing Figures

MULTIPLE USE DIGITAL TONE GENERATOR IN TELEPHONE

The invention relates to an electronic telephone set having number selection push-buttons and further control elements and comprising a digital tone generator for push-button tone dialling incorporating an oscillator having a fixed oscillator frequency and a logic circuit comprising a first frequency divider for dividing the oscillator frequency, the divisors of this frequency divider being adjustable for push-button tone dialling under the control of the number selection push-buttons.

Such a telephone set is disclosed in the periodical "IEEE Journal of Solid State Circuits", June 1977, pages 238-242. The set described in this article generates the tone signals required for push-button tone dialling in accordance with the DTMF-system with the aid of adjustable frequency dividers as is illustrated more specifically by FIG. 6 of the relevant article in the above-mentioned periodical.

In electronic telephone sets it is desirable, in addition to perform functions other than the push-button tone dialling with the aid of electronic circuits, preferably monolithic integrated circuits. Such additional functions are, for example, generating an apparatus ringing signal, monitoring the frequency of an incoming a.c. voltage in the on-hook state of the handset or providing a non-recurrent brief interruption of the subscriber's line for signalling purposes, the function commonly referred to as the call-back function.

It is customary in an electronic telephone set for these other functions to be performed by separate circuits which are especially intended for those functions. Thus, "Nachrichtentechnische Zeitschrift" Vol. 36 (1983) number 5, page 345 discloses an electronic telephone set for DTMF-tone dialling in which an apparatus ringing signal can be produced by a separate ringing circuit which is specially provided for that purpose. A considerable portion of the chip surface of the integrated circuit of which this ringing circuit forms part is occupied by this ringing circuit, which is disadvantageous from a technical and economic point of view.

U.S. Pat. No. 4,070,551 discloses a telephone set in which a variety of tone signals are generated in response to commands received. These tone signals are obtained with the aid of a tone generator in which a fixed oscillator frequency is divided so as to obtain the desired tone frequencies. Generating these tone signals is also effected by means of a separate circuit which is specially provided for that purpose, so that a separate oscillator and a separate frequency dividing circuit are necessary. This requires many components or, when implemented by integrated circuit techniques a large portion of the available chip surface or even a separate integrated circuit.

It is an object of the invention to provide an electronic telephone set of the type set forth in the opening paragraph in which a number of functions other than the tone push-button selection can be realized in a way which in the event of monolithic integration occupies only a small additional surface area of the integrated circuit.

According to the invention, the electronic telephone set is therefore characterized in that it comprises a detection circuit for optionally detecting signals on the subscriber's line terminals of the telephone set or activating at least one of the further control elements of the telephone set, and that the frequency divider is adjustable to at least one additional divisor under the control of the detection circuit. Because of these simple additions the digital tone generator which was originally intended to generate DTMF tones can now also be used for generating different tones or generating desired time intervals in dependence on detected commands from the subscriber line or from the further control elements. "Further control elements" must, for example, be understood to mean an additional push-button for the call-back function or the hook contact of the telephone set.

A further embodiment of the telephone set in accordance with the invention suitable for generating a ringing signal for the acoustic ringing arrangement of the telephone set is characterized in that the detection circuit is arranged for detecting on the subscriber line terminals an a.c. voltage having an amplitude which exceeds a predetermined threshold value and that the logic circuit comprises a first switch for coupling the output of the frequency divider to the acoustic ringing signal generator of the telephone set under the control of at least the detection circuit. These measures have the advantage that in this way one gets the choice of apparatus ringing signals other than the cutomary a.c. voltage of, for example, 25 Hz on the subscriber's lines, so that the sound produced by the ringing signal generator can be given a spectral composition which can be heard better and is more agreeable to the car than the customary electromechanical bells. Moreover, the apparatus ringing signal generated by the telephone set is independent of the frequency of the line ringing signal used for ringing on the subscriber line, which increases the fields of application of this telephone set.

It should be noted that from the periodical "Review of the Electrical Communication Laboratories" Vol. 22, No. 3-4, March/April 1974, an electronic telephone set is known in which the DTMF tone generator is used to generate in the on-hook condition of the handset a 1336 Hz apparatus ringing signal which pulsates at the frequency of the received line ringing signal, in response to the line ringing signal on the subscriber line. This apparatus ringing signal is however not obtained with the aid of a digital tone generator comprising a frequency divider having an additional divisor, but by switching-on an RC-oscillator which is normally intended for DTMF tone selection. The dual-purpose use of the frequency dividers of the digital tone generator is consequently not known from this periodical.

A further embodiment of the telephone set according to the invention is particularly suitable for supervising the frequency of a.c. voltages on the subscriber line in the on-hook condition of the handset. In this embodiment the logic circuit further comprises a second frequency divider for dividing the oscillator frequency, the divisor of this second frequency divider being adjustable under the control of the push-buttons, and a third frequency divider having a divisor required for push-button tone dialling, the input of this third frequency divider being connected to the output of the second frequency divider. This embodiment of the telephone set according to the invention is characterized in that:

the logic circuit comprises a second switch for connecting the input of the second frequency divider to the output of the first frequency divider under the control of the detection circuit, the second frequency divider is adjustable under the control of the detection circuit to at least one additional divisor for establishing an upper limit frequency;

the third frequency divider is adjustable under the control of the detection circuit to a second divisor for establishing a lower cut-off frequency, the digital tone generator comprises a comparison circuit for comparing the frequency of the a.c. voltage with the lower limit frequency and with the upper limit frequency, and that the first switch couples the first frequency divider to the acoustic ringing signal generator of the telephone set under the control of the comparison circuit output signal.

The upper and lower limit frequencies can be chosen such that interfering voltages, for example owing to induction by electric rail transport, do not result in the ringing device of the telephone set being activated.

A further embodiment of the telephone set according to the invention is also suitable for the call-back function. To that end this telephone set is characterized in that:

it comprises a third switch for interrupting the subscriber's line, the digital tone generator comprises a line interrupt circuit for controlling the third switch, the digital tone generator also comprises a fourth frequency divider whose input is connected to the output of the third frequency divider and whose output is connected to the input of the line interrupt circuit.

and that under the control of the detection circuit and in dependence on the activation of one of the further control elements of the telephone set the line interrupt circuit applies a pulse to the third switch for interrupting the subscriber's line, the pulse duration of this pulse being equal to the period of the output signal of the fourth frequency divider.

Figure 2:
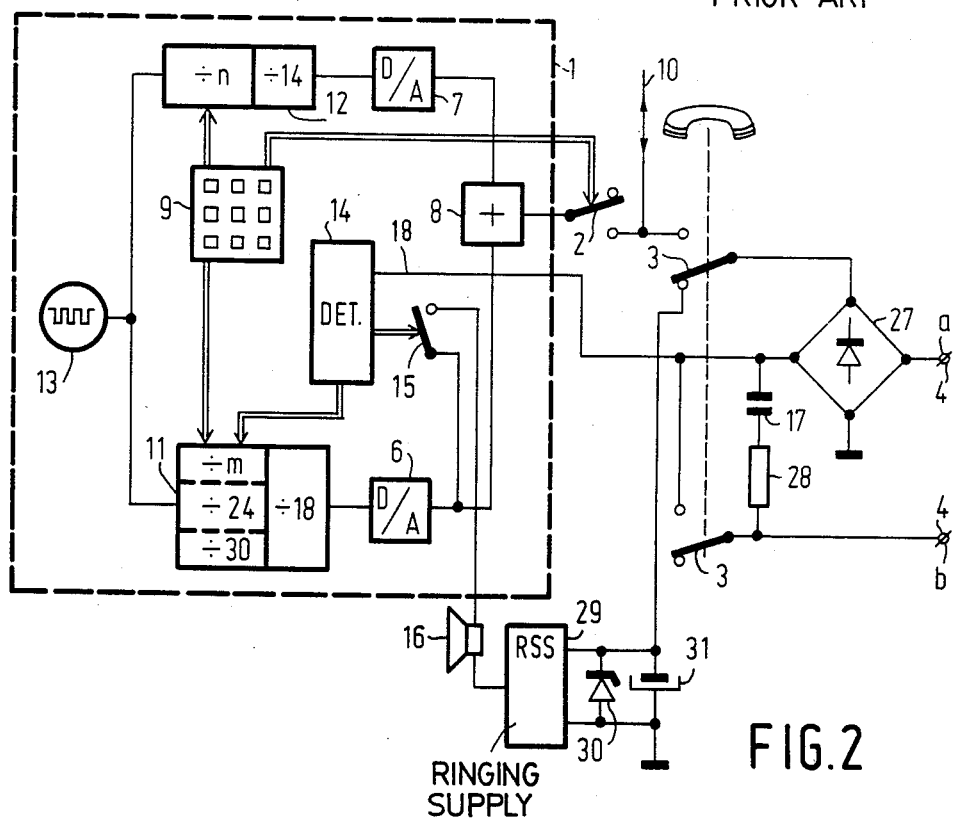
Figure 3:
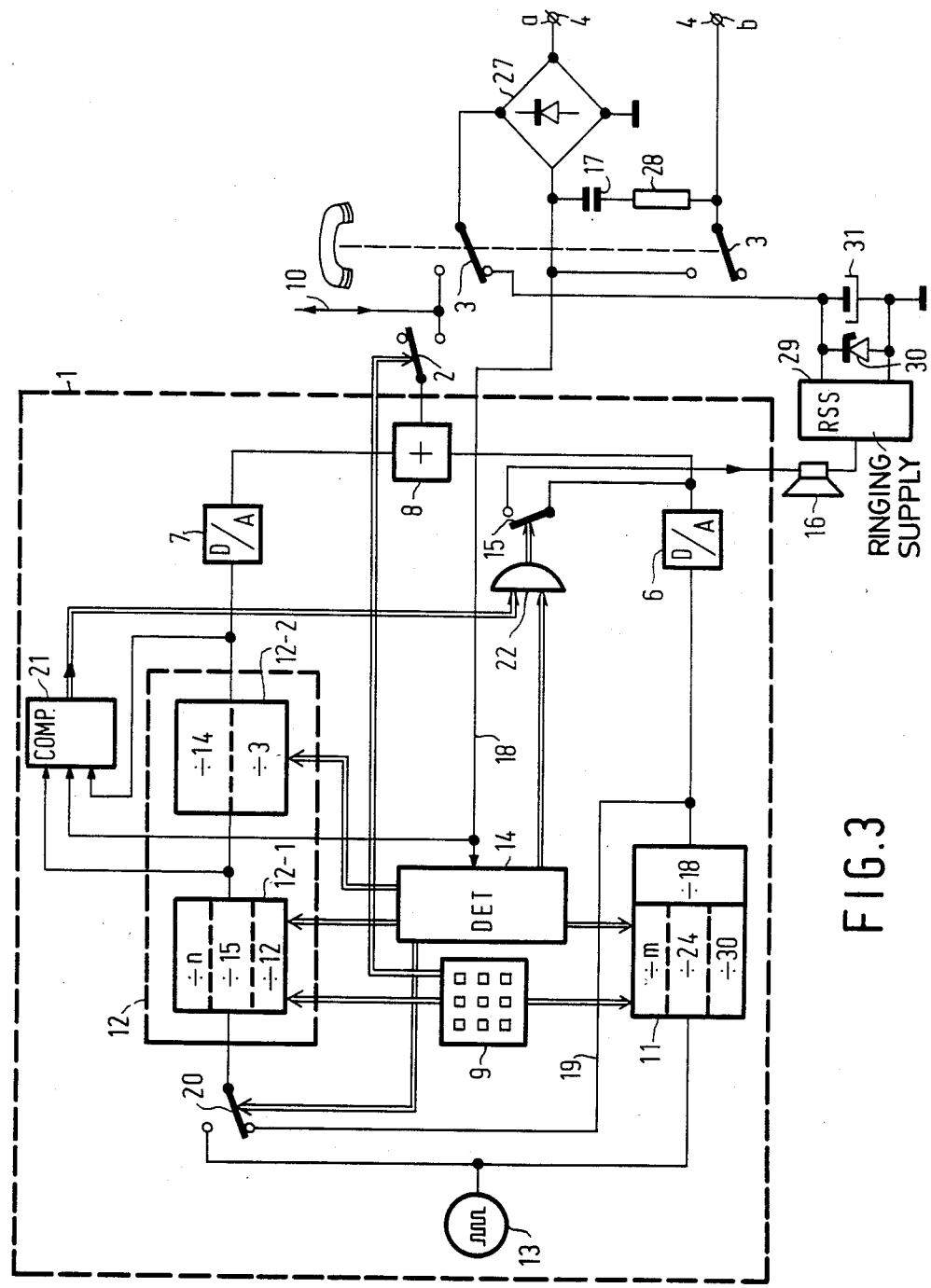
Figure 4:
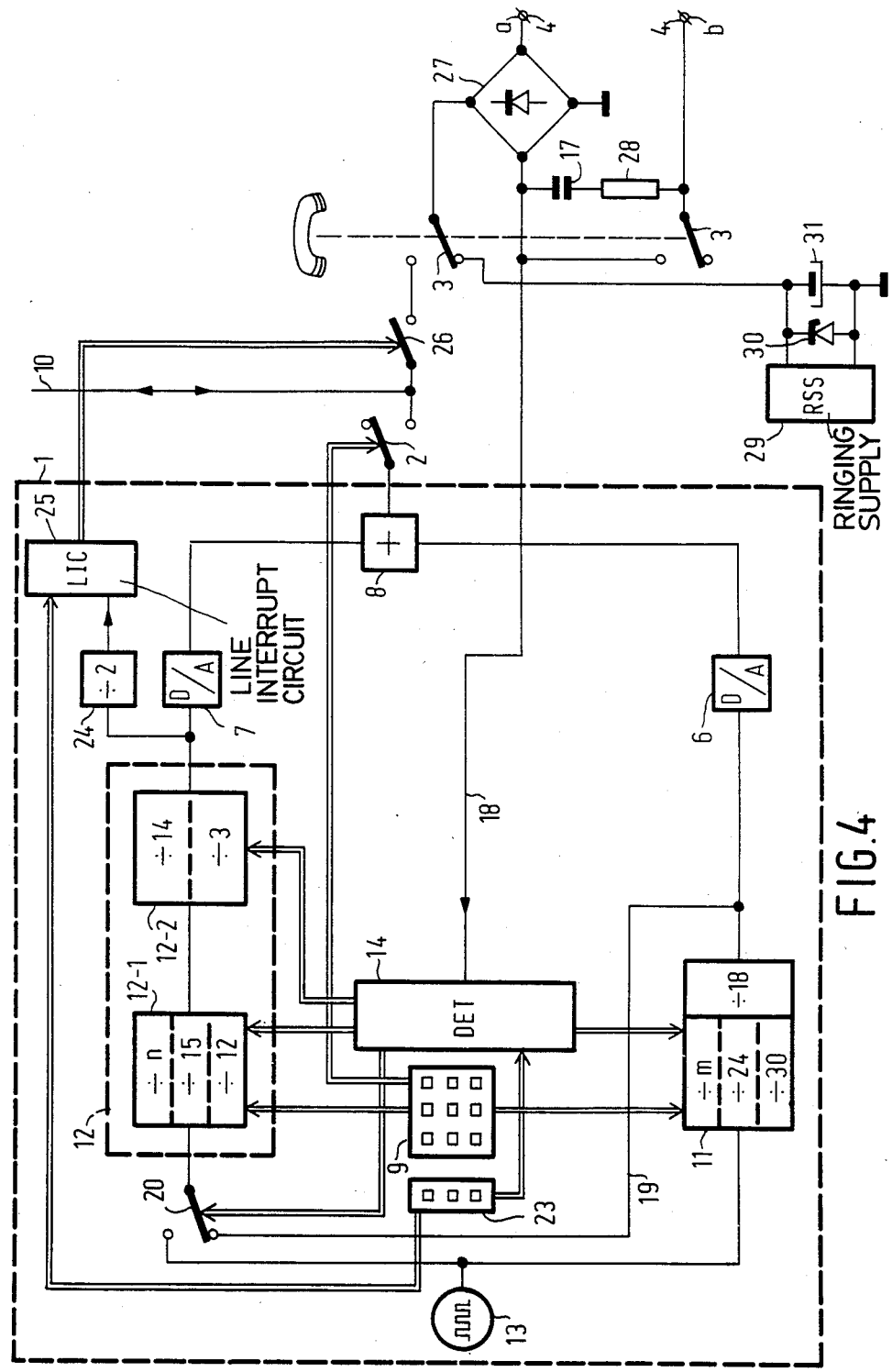

The invention will now be described in greater detail by way of example with reference to the accompanying Figures, corresponding components in the different Figures having been given the same reference numerals. Herein:

FIG. 1 shows an electronic telephone set as it is known from the prior art,

FIG. 2 shows an electronic telephone set according to the invention comprising a digital tone generator suitable for generating an apparatus ringing signal, FIG. 3 shows an electronic telephone set according to the invention comprising a digital tone generator suitable for monitoring the frequency of the line ringing signal and FIG. 4 shows an electronic telephone set according to the invention comprising a digital tone generator suitable for the call-back function.

The prior art telephone set shown in FIG. 1 comprises a digital tone generator 1 for generating dialling tones for push-button tone dialling in accordance with the DTMF-system. This tone generator is connected to the subscriber line terminals 4 via a switch 2 and the hook contacts 3. The acoustic ringing signal generator 5 of the telephone set is provided between the subscriber line terminals 4 and behind the hook contact 3 seen from the telephone set. In FIG. 1, this acoustic ringing signal generator is constituted by a ringing capacitor and an electro-mechanical bell. A different, also known manner of ringing is effected with a separate ringing signal circuit which applies a ringing signal to an electro-acoustic transducer, for example a loudspeaker.

In one of the wires of the subscribers line a rectifier circuit 27 is provided between the acoustic ringing signal generator 5 and one of the hook contacts. This rectifier circuit renders the telephone set insensitive to polarity changes of the voltage on subscriber line terminals 4.

The logic circuit 1 is formed by an oscillator 13 having a fixed oscillator frequency of, for example, 400 kHz, two frequency dividers 11 and 12 having an adjustable divisor, two digital-to-analog converters 6 and 7, an adder circuit 8 and a keyboard 9. The fixed oscillator frequency is divided by each of the two frequency dividers 11 and 12 under the control of the keyboard 9 to obtain two frequencies from the DTMF-system. The two frequencies are added together after conversion by a D/A-converter and applied to the subscriber line. If none of the push-buttons of the keyboard 9 is activated, switch 2 is opened. Any speech signals are transmitted to and from a speech circuit, not shown, via a speech transmission line 10.

Each of the two frequency dividers 11 and 12 is constituted by a series arrangement of a divider having a variable divisor and a divider having a fixed divisor. When an oscillator frequency of, for example, 400 kHz is used, the fixed divider of frequency divider 11 has a divisor of, for example, 18 and the fixed divider of frequency divider 12 then has a divisor of, for example, 14. By slightly extending the logic circuits forming the said frequency dividers it is possible to cause the digital tone generator to perform functions other than generating dialling tones.

FIG. 2 shows an electronic telephone set which, by slightly extending the logic circuits of the digital tone generator can be made suitable for detecting a line ringing signal on the terminals 4 and generating an apparatus ringing signal in dependence thereon. The telephone set shown in FIG. 2 is formed by the set shown in FIG. 1 to which a plurality of elements have been added and from which the conventional ringing signal generator 5 has been omitted.

In FIG. 2, the tone generator 1 comprises a detection circuit 14 for detecting the line ringing signal on the terminals 4. To that end the detection circuit 14 comprises a connecting line 18, which, in the on-hook condition of the handset is connected to the terminals 4. The adjustable frequency divider 11 has some additional logic switching elements so that two extra divisors can be realized by means of the adjustable portion of this frequency divider, for example the divisors 24 and 30. So, in combination with the fixed portion, having the divisor 18, of frequency divider 11, the divisors 432 and 540 are obtained.

In addition, the telephone set shown in FIG. 2 comprises an acoustic ringing signal generator 16 for producing the acoustic ringing signal and a switch 15 for applying the electric ringing signal to ringing signal generator 16. Ringing signal generator 16 is fed by ringing supply 29 which converts the line ringing signal rectified by rectifier circuit 27 into supply energy for the acoustic ringing signal generator 16.

A capacitor 31 used for smoothing the rectified, pulsating voltage is provided at the input of ringing supply 29. A Zener diode 30 which together with resistor 28 constitutes the overvoltage protection in the on-hook condition of the handset is arranged in parallel with capacitor 31. Capacitor 17 which together with resistor 28 forms a series arrangement has for its object to provide the customary separation of direct current and alternating current in the on-hook condition. In the on-hook condition of the handset tone generator 1 is also powered by ringing supply 29 in a manner not shown in the Figure.

Detection circuit 14 compares the amplitude of an a.c. voltage signal on the terminals 4 with a predetermined threshold value in the circuit. If the amplitude of the a.c. voltage exceeds this threshold value then frequency divider 11 is alternately set to one of the two extra divisors by means of a control signal. At the same time, switch 15 is closed under the control of detection circuit 14, causing the apparatus ringing signal produced by oscillator 13 and frequency divider 11 to be applied to acoustical ringing signal generator 16.

It is possible to have the rate at which frequency divider 11 is alternately set to the two divisors be determined by the frequency of this a.c. voltage which is detected as a line ringing signal. It is, however, alternatively possible to give frequency divider 12 some additional divisors as will be described in detail with reference to FIGS. 3 and 4. Thus, frequencies can be obtained which are of the same order of magnitude as the frequency of the line ringing signal. Instead of alternating between both divisors at the frequency of the line ringing signal it is possible to alternate between the two extra divisors of frequency divider 12 at a rate thus obtained.

Starting from an oscillator frequency of 400 kHz and divisors of divider 11 having the value 432 (=24×18) and 540 l (=30×18), ringing frequencies of 925 Hz and 740 Hz, respectively, are obtained. Consequently, the pitch of the ringing signal changes between these two frequencies with a frequency of change of, for example, 25 Hz. The choice of the two additional divisors with a mutual ratio of 4:5 has the additional advantage that a frequency ratio is obtained which is known as a major interval which has the properties of producing more specifically a pleasant sound impression.

FIG. 3 shows an electronic telephone set which by some changes compared with FIG. 2 has been made suitable for monitoring the frequency of the line ringing signal on the subscriber's line. The set circuit diagram of FIG. 3 is obtained by adding some elements to the circuit diagram of FIG. 2.

The digital tone generator 1 of FIG. 3 comprises a switch 20, which renders the output of frequency divider 11 connectable to the input of frequency divider 12, this input then being also decoupled from oscillator 13. The adjustable frequency divider 12 is provided with some additional logic circuit elements so that two additional divisors can be realized with the adjustable portion 12-1 of this frequency divider, for example the divisors 15 and 12. The originally non-adjustable portion 12-2 of frequency divider 12 has become adjustable, by the addition of some logic circuit elements to an additional divisor, for example 3. Furthermore, the known generator 1 is extended by a comparison circuit 21 for comparing the frequency of the line ringing signal on the subscriber line terminals with a lower and an upper frequency whilst an AND-gate 22 is added for the control of switch 15.

If an a.c. voltage of a sufficiently high amplitude is present on terminals 4 then detection circuit 14 switches frequency-divider 11 to its additional divisors, as described above with reference to FIG. 2. Detection circuit 14 also adjusts switch 20 to the position shown in FIG. 3. As a result thereof the output of frequency divider 11 is connected to the input of frequency divider 12-1 via connecting line 19.

Frequency divider 12-1 is alternately adjusted to one of the two additional divisors under the control of detection circuit 14, at the same rate as frequency divider 11. The two additional divisors of frequency divider 12-1 have been chosen such that the product of an additional divisor of frequency divider 12-1 and an additional divisor of frequency divider 11 is equal to the product of the two other additional divisors. This holds for the divisors 15 and 24 and the divisors 12 and 30. By this choice of the divisors and by the simultaneously alternation of the divisors, a signal having one constant frequency, denoted the upper limit frequency is produced at the output of frequency divider 12-1. In the said numerical examples this limit frequency is approximately 62 Hz.

Frequency divider 12-2 is adjusted to the additional divisor 3 under the control of detection circuit 14. Thus, a signal having a frequency which is denoted as the lower limit frequency is produced at the output of frequency divider 12-2. In the said numerical examples this limit frequency is approximately 21 Hz.

The upper and the lower limit frequencies are applied to comparison circuits 21, as is also the a.c. voltage signal incoming via terminals 4. If the frequency of this a.c. voltage signal is located between the lower and upper limit frequencies then the comparison circuit 21 applies a signal which is characteristic of this frequency state to AND-gate 22. If at the same time the amplitude of the a.c. voltage signal exceeds the threshold value which was preset in detection circuit 14, then detection circuit 14 applies a signal characterizing this amplitude state to AND-gate 22. In the presence of these two input signals on AND-gate 22 the a.c. voltage is detected as the line ringing signal with the proper frequency and an adequate amplitude. In that case AND-gate 22 applies a signal to switch 15. Under the control thereof this switch is closed, which causes the apparatus ringing signal produced by frequency divider 11 to be applied to acoustic ringing signal generator 16.

It should be noted that the output signal of comparison circuit 21 may alternatively be applied directly to switch 15 with the object of closing it. In that case no signal is applied from detection circuit 14 to switch 15. Then only the frequency of the a.c. voltage signal coming in via terminals 4 is supervised.

FIG. 4 shows an electronic telephone set with which non-recurrent brief line interruptions for signalling purposes can be adjusted. This said function is known as the call-back function.

The said circuit diagram of FIG. 4 is realized by omitting switch 15 and acoustic ringing signal generator 16 from the set shown in FIG. 2 and to add some other elements to the Figure thus obtained. The elements added are an additional keyboard 23 with push-buttons for said functions other than the push-button tone dialling, an additional divider 24, a line interrupt circuit 25 and a switch 26 for brief interruptions of the subscriber line. Frequency divider 12 is in the form of a series arrangement of an adjustable divider 12-1 having additional divisors and a divider 12-2 having an additional divisor. The additional divider 24 has a divisor of, for example, the value 2.

The line interrupt circuit 25 is controlled by the divider 24 and by a key of the keyboard 23, the key commonly referred to as the call-back key. The output of the line interrupt circuit 25 is connected to switch 26. The contact of the call-back key is also connected to detection circuit 14.

When the call-back key is operated, the frequency dividers 11 and 12 are adjusted to the respective divisors 24, 30 and 15, 12. It is alternatively possible for these frequency dividers to be adjusted to only one additional divisor, for example to 30 and 12, respectively, which is taken as the starting point for simplicity of the description. Now a signal having a frequency of approximately 20 Hz is available at the output of frequency divider 12. This signal is so divided by frequency divider 24 that a signal having a frequency of approximately 10 Hz is obtained. By operating the call-back key, line interrupt circuit 25 applies a signal to switch 26, which signal is in the form of a pulse having a pulse duration equal to one period of the output signal of frequency divider 24. Switch 26 is opened during this pulse, which causes the subscriber line to be interrupted for approximately 0.1 s.

What is claimed is:

1. In an electronic telephone set having line terminals, number selection push-buttons, digital tone generator means having an oscillator having a fixed oscillator frequency and logic circuit means connected to said oscillator and comprising first frequency divider means for dividing said oscillator frequency by one of the plurality of divisors selectable under control of said number selection push buttons, a plurality of further control elements, and means for externally generating a control signal, the improvement comprising:
   detection means for detecting said externally generated control signal and generating a frequency control signal in response thereto;
   additional frequency dividing means; and
   means for interconnecting said additional frequency dividing means between said first frequency divider means and said selected one of said further control elements in response to said frequency control signal.

2. An electronic telephone set as set forth in claim 1, wherein said externally generated control signal is a line ring signal having an amplitude exceeding a predetermined threshold value; wherein said electronic telephone set further has an acoustic ringing signal generator, said acoustic ringing signal generator constituting said selected one of said further control element; and wherein said interconnecting means comprises means for connecting said additional frequency divider means to said acoustic ringing signal generator.

3. An electronic telephone set as set forth in claim 2, wherein said additional frequency dividing means comprises means for alternately dividing said oscillator frequency at a given rate by a first or a second additional divisor.

4. An electronic telephone set as set forth in claim 3, wherein said signal on said line terminals is an AC signal having a predetermined frequency; and wherein said given rate corresponds to said predetermined frequency.

5. An electronic telephone set as set forth in claim 2, wherein said interconnecting means comprises means for creating an upper and lower limit frequency signal in response to said frequency control signal;
   wherein said line ring signal has a predetermined frequency;
   wherein said telephone set further has means for comparing said predetermined frequency to said upper and lower limit frequencies and generating a comparator output signal when said predetermined frequency is between said lower and upper limit frequencies; and
   and wherein said interconnecting means couples said first frequency divider means to said acoustic ringing signal generator means under control of said comparison output signal.

6. An electronic telephone set as set forth in claim 5, wherein said electronic telephone set further has second frequency divider means having a second frequency divider input and a second frequency divider output, and third frequency divider means having a third frequency divider input connected to said second frequency divider output;
   wherein said interconnecting means further comprises a second switch for connecting said second frequency divider input to said first frequency divider means;
   wherein said additional frequency dividing means comprises means for creating at least one additional division for said second frequency divider means thereby creating said upper limit frequency signal and a second divisor for said third frequency divider means, thereby establishing said lower limit frequency signal.

7. An electronic telephone set as set forth in claim 1, said set further having interrupter switch means for interrupting the subscriber line, and a line interrupter circuit for controlling said interrupt means, said line interrupter circuit constituting said selected one of said further control elements.

* * * * *